United States Patent [19]
Rote et al.

[11] Patent Number: 5,253,591
[45] Date of Patent: Oct. 19, 1993

[54] HIGH SPEED MAGLEV DESIGN

[75] Inventors: Donald M. Rote, Lagrange; Jianliang He, Woodridge; Howard Coffey, Darien, all of Ill.

[73] Assignee: The United States of America as represented by the United States Department of Energy, Washington, D.C.

[21] Appl. No.: 952,439

[22] Filed: Sep. 28, 1992

[51] Int. Cl.$^5$ ............................................. B60L 13/00
[52] U.S. Cl. ................................... 104/281; 104/139
[58] Field of Search ............... 104/281, 282, 286, 139; 505/902, 903, 904, 905, 906, 907, 908

[56] References Cited

U.S. PATENT DOCUMENTS

| | | | |
|---|---|---|---|
| 3,664,268 | 5/1972 | Lucas et al. | 104/286 |
| 3,892,185 | 7/1975 | Guderjahn | 104/281 |

FOREIGN PATENT DOCUMENTS

| | | | |
|---|---|---|---|
| 2312242 | 9/1974 | Fed. Rep. of Germany | 104/281 |
| 2429867 | 1/1976 | Fed. Rep. of Germany | 104/286 |
| 54-42717 | 4/1979 | Japan | 104/281 |
| 62-277004 | 12/1987 | Japan | 104/281 |
| 4-88810 | 3/1992 | Japan | 104/281 |
| 4-125007 | 4/1992 | Japan | 104/281 |

OTHER PUBLICATIONS

Preliminary Design for a Maglev Development Facility, H. T. Coffey et al. Oct. 1991.

*Primary Examiner*—Mark T. Le
*Attorney, Agent, or Firm*—Bradley W. Smith; John M. Albrecht; William R. Moser

[57] ABSTRACT

A propulsion and stabilization system for an inductive repulsion type magnetically levitated vehicle which is propelled and suspended by a system which includes dividing the superconducting magnets into two types: a strong field magnet which is located vertically below the vehicle for propulsion and guidance and a weak field superconducting magnet located at the ends of the vehicle for levitation and added guidance. Several proposed embodiments exist for the placement of the magnetic field shielding: locating the shielding on the vehicle, locating the shielding on the guideway, and locating the shielding on the guideway and adding shielding to the vertical undercarriage. In addition, the separation between the vehicle and the guideway can be controlled to reduce the exposure of the passenger cabin to magnetic fields.

6 Claims, 3 Drawing Sheets

HIGH SPEED MAGLEV DESIGN

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to a propulsion and suspension system for an inductive repulsion type, magnetically levitated vehicle, and more specifically, to a magnetically levitated ("maglev") vehicle which is propelled and suspended by a system which includes the use of two sets of superconducting magnets: one set for vehicle stabilization and levitation and the other set for propulsion and guidance. The invention further includes the option of using shielding on the guideway in lieu of on the vehicle.

Maglev development began more than two decades ago in the United States, Germany, Japan, Canada and England. In the United States, renewed interest has been directed toward magnetic levitation transportation systems in view of such factors as energy conservation, high speed transportation at ground level, economic and environmental problems associated with conventional systems, and competition from West Germany and Japan.

The use of an electrodynamic suspension to provide levitation in maglev systems is well known in the prior art (see further, U.S. Pat. No. 3,470,828, issued Oct. 7, 1969, to Powell et al). Several systems include a linear synchronous motor with electrodynamic repulsion system to provide propulsion by magnetic means (see further, U.S. Pat. No. 3,815,511, issued Jun. 11, 1974, to Dukowicz et al).

A number of methods of using magnetic forces to suspend, guide, and propel vehicles have been described in the literature of which there are two basic suspension concepts: one called Electromagnetic System (EMS) utilizes the attractive force between controlled d.c. electromagnets and ferromagnetic rails while the other called the Electrodynamic System (EDS) utilizes the repulsive force between eddy currents induced in non-ferromagnetic metal conductors and superconducting magnets (SCM's) propelled relative to the conductors through the use of long-stator linear synchronous motors (LSM). The EDS system has many advantages over EMS and other maglev systems. It can provide a large suspension height, reducing the required stiffness and the required precision alignment of the guideway supporting structure. These factors can substantially reduce guideway construction and maintenance costs and allow the system to run safely at high speeds. The EDS system can also achieve a high payload efficiency because the air-core superconducting magnets used on board the vehicle are lightweight. In addition, because the EDS system is inherently stable, it does not need complicated feedback control for leviation as does the EMS system.

It is possible to improve the power factor of the LSM by increasing the current in the superconducting coils; however, this leads to a potential shortcoming of the EDS system, the presence of a moderately strong magnetic field in the passenger cabin. From the propulsion-system-performance point of view, it is necessary to keep current density in the SCM's as high as possible. By maintaining the high current density, the LSM can be operated so as to compensate for the inductive reactance of the long stator LSM windings and thus, allow the length of the energized guideway to be increased without an excessively low power factor. But, such a requirement is in conflict with the requirement to minimize the field strength in the passenger compartment. Shielding is one method of reducing the magnetic field experienced by the passenger compartment; however, shielding the passenger compartment from the magnetic field with a ferromagnetic material often results in a reduction in overall performance of the maglev vehicle due to the increased weight. The field experienced by the passenger compartment can also be reduced by reducing the number of SCM's and by placing them at the ends of the vehicle as proposed by the Japanese for their commercial EDS system. However, concentrating the SCM's at the ends of the vehicle can introduce space harmonics to the propulsion system which may affect the performance of the LSM and cause ride comfort problems. Limiting the number of SCM's may also reduce the length of the energized motor section and complicate power distribution.

Generally, the SCM's or the electromagnets are mounted in the lower part of the vehicle; the iron rails used in the EMS system or the nonferromagnetic conductors used in the EDS system are mounted on the fixed guideway. The propulsion system most frequently used for either the EMS or EDS suspension is the linear synchronous motor (LSM). The LSM consists of windings placed on the guideway that are energized by an external source of 3-phase or multiphase power. The 3-phase or multiphase excitation of the windings produces a traveling magnetic wave that interacts with the onboard magnets and moves the vehicle along the guideway at a synchronous speed, a speed equal to that of the traveling magnetic wave.

The Japanese MLU-002 electrodynamic suspension system is one of the most highly developed systems of this type in the world. Superconducting magnets on the vehicle react against conventional, normally conducting, coils in the guideway. In early tests, the superconducting magnets were placed in a horizontal position and reacted against horizontal coils on the bottom of the guideway. The superconducting magnets were later redesigned and located vertically, reacting with horizontal coils on the guideway for levitation and vertical coils located on the sidewalls of the guideway for propulsion and guidance. The guidance is achieved by cross connecting the propulsion coils in a null-flux configuration to reduce the electromagnetic drag. In a more recent version, the Japanese have replaced the horizontal suspension coils mounted on the guideway floor with "FIG. 8" null flux suspension coils mounted on the guideway vertical walls. Linear synchronous propulsion coils are also located on the sidewalls, but since they are symmetrically located with respect to the null-flux coils, they do not interact with them.

One of the shortcomings of the existing EDS systems, such as the Japanese MLU and a Canadian concept design is that both systems use single-sided LSM's for propulsion in which only half of the total magnetic field generated by the SCM's is used. The unused portion of the field contributes to the field in the passenger car.

In the invention described herein, the SCM's are separated into weak field and strong field SCMs. The strong field SCM are mounted vertically on a vertical undercarriage at a suitable distance below the vehicle to substantially reduce the field strength within the passenger cabin. Guideway mounted propulsion coils laterally bound the strong field SCM's. These coils are excited by a multiphase external power source creating a traveling magnetic wave. The strong field SCMs interact with the coils on either side to operate as a double sided LSM system. This arrangement acts to limit the magnetic field above the magnets. Weak field SCMs are attached to the vehicle and are used only for stabilization and levitation to further minimize the field strength associated with the passenger areas. In one form of the embodiment, magnetic shielding is located on the guideway to reduce the vehicle weight.

The repulsive suspension and guidance force is generated by the interaction between a rapidly changing magnetic field generated by superconducting magnets aboard the moving vehicle and eddy currents induced in the conductive guideway. The conductive guideway can be made of a continuous sheet of a non-magnetic conductor, such as aluminum, or of discrete coils, loops or slotted hollow tubular type structures of similar material.

It is an object of this invention to employ two types of superconducting magnets of different field strength: a group of strong field SCM mounted vertically underneath the vehicle for propulsion and guidance and a group of weak field SCM at the end of the vehicle for suspension and guidance.

It is a further object of this invention to vary the location of the magnetic shielding to optimize performance.

Additional advantages, objects and novel features of the invention will become apparent to those skilled in the art upon examination of the following and by practice of the invention.

SUMMARY OF THE INVENTION

To achieve the foregoing and other advantages, this invention comprises dividing the superconducting magnets into two types: a strong field magnet which is located vertically below the vehicle for propulsion and guidance and a weak field superconducting magnet located at the ends of the vehicle for levitation and guidance purposes. In one of the proposed embodiments, magnetic shielding is located on the guideway to reduce vehicle weight.

BRIEF DESCRIPTION OF THE DRAWINGS

The present invention is illustrated in the accompanying drawings where.

DETAILED DESCRIPTION OF THE INVENTION

Figure 1:
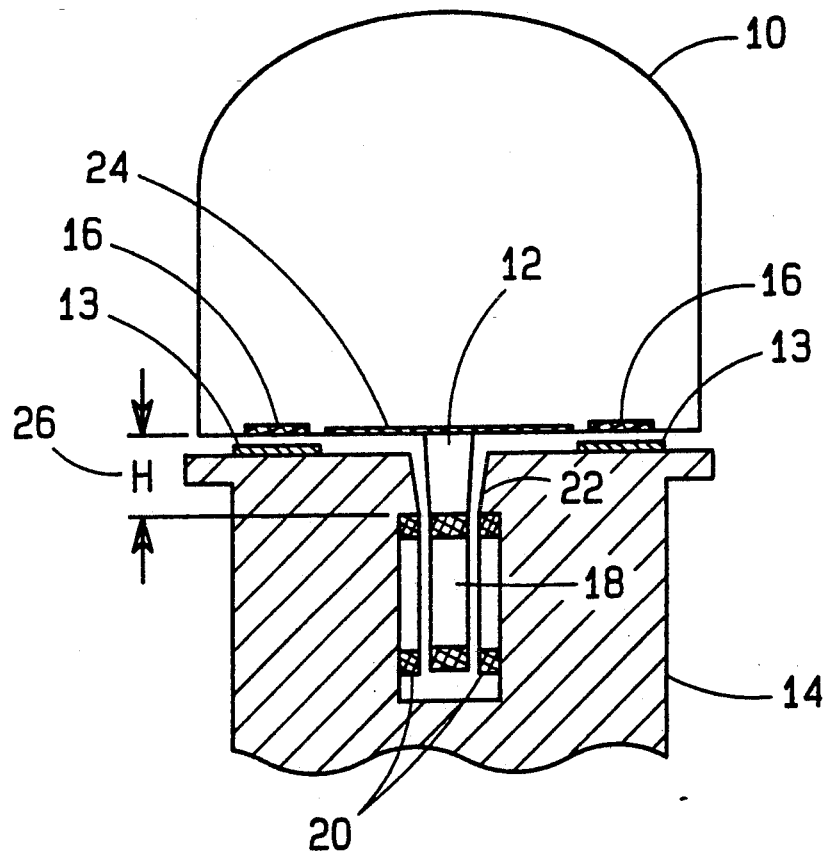
FIG. 1 is a schematic cross-section of the maglev vehicle and its electrodynamic levitation and propulsion systems.

In the schematic cross-section of the system, FIG. 1, vehicle 10 and its vertical undercarriage 12 are levitated and propelled by electrodynamic systems included within the vehicle and the guideway 14. The guideway 14 structure includes beams and piers for elevated structures and foundations for at grade structures. The guideway 14 is constructed of concrete or similar material formed to include a slot 22 which will partially enclose the vertical undercarriage 12 in the operating state and house part of the electrodynamic systems. The subject invention separates the onboard superconducting magnets (SCM) into two groups: weak field SCM's 16 and the strong field SCM's 18. The nonmagnetic conductors 13 interact with the weak field SCM's 16 to provide vehicle 10 leviation and guidance. The weak field SCM's 16 are mounted horizontally at the vehicle 10 ends, FIG. 4, and may have only a third of the field strength of the strong field SCM's 18. As a result of this arrangement, the weak field SCM's make small contributions to the field in the passenger cabin of the vehicle 10.

In the preferred embodiment, the nonmagnetic conductors 13 are comprised of flat sheets, L-shaped sheets, or an array of discrete coils depending on the degree of lateral guidance force and drag force desired. These non-magnetic conductors are constructed of a conductive, non-ferromagnetic metal such as aluminum. When vehicle 10 is in motion, a repulsive force is created between the magnet 16 and nonmagnetic conductors 13 by the interaction of the magnetically generated field and the field generated by the eddy currents induced in the nonmagnetic conductors 13 by the time varying magnet field of the passing magnet. This repulsive force levitates magnets 16, the attached vehicle 10 and the vertical undercarriage 12 to maintain the vertical position of the vehicle. The vertical undercarriage 12 provides a vertical extension of the vehicle and houses the strong field SCM's 18 which are mounted vertically underneath the vehicle 10, are attached to the vertical undercarriage 12 and are distributed continuously along the vehicle 10, FIG. 4.

Figure 2:
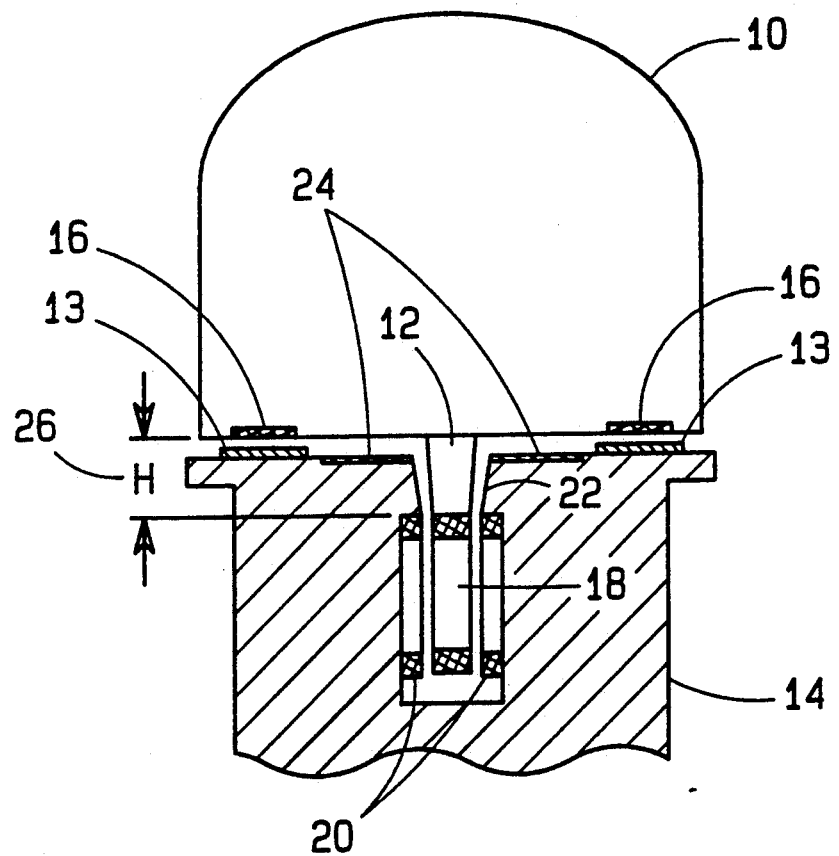
FIG. 2 is schematic cross-section of an alternate configuration in which the magnetic shielding is located on the guideway.
Figure 3:
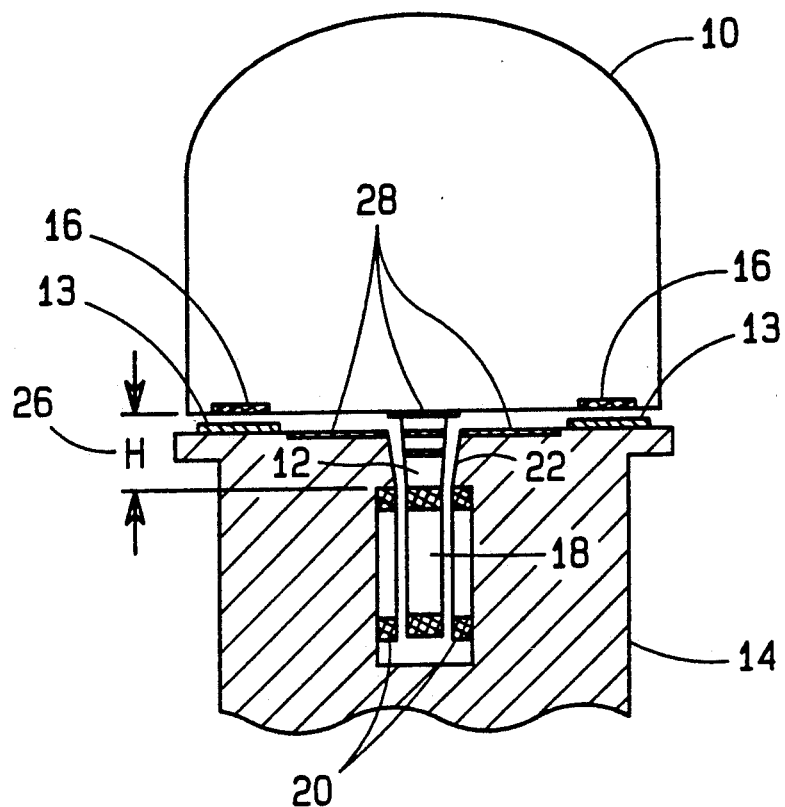
FIG. 3 is a schematic cross-section of a further alteration in which the magnetic shielding is located on the guideway and also in the vertical undercarriage supporting the strong field superconducting magnet.

The strong field SCM's 18 are enclosed by two arrays of ground coils 20 attached to the vertical slot 22 constructed in the guideway 14. The ground coils 20, in the preferred embodiment, are comprised of three or multiphase windings and are oriented parallel to the strong field SCM's. The coils 20 are energized by an external multiphase power source to create a traveling magnetic wave which interacts with the strong field SCM's 18 to form a linear synchronous motor (LSM) and provide propulsion and guidance for the vehicle 10 in the direction of the traveling magnetic wave. This configuration is referred to as double sided LSM. The magnetic field of the strong field SCM's 18 is of high polarity and falls off rapidly with distance from the magnets 18. Thin sheets of iron 24 or other shielding material are placed along the base of the vehicle 10 above the strong field SCM's 18 to shield the interior of the vehicle from the magnetic field associated with the strong field SCM's 18. The distance H 26, FIG. 1, is an adjustable design parameter which can be varied to minimize the magnetic field in the passenger cabin of the vehicle 10 and to optimize the total vehicle weight. In an alternate embodiment, the iron shielding 24, or other ferromagnetic material, FIG. 2, could be placed on the guideway 14 to minimize the weight of the vehicle 10. The iron shielding 24 can be replaced by electrically conducting eddy-current shielding to produce a similar effect when the vehicle is in motion. A further alternate embodiment, FIG. 3, has part of the vertical undercarriage 12 between the strong field SCM's 18 and the vehicle 10 constructed partially of iron 28, or other ferromagnetic material, to improve the shielding performance.

The subject invention provides a means to minimize the exposure of the passenger cabin of the vehicle 10 to large magnetic fields due to the large distance separating the strong field SCM's and the passenger cabin, the vertical orientation of the strong field SCM's, and the effective high polarity of these magnets in the double sided LSM.

Figure 4:
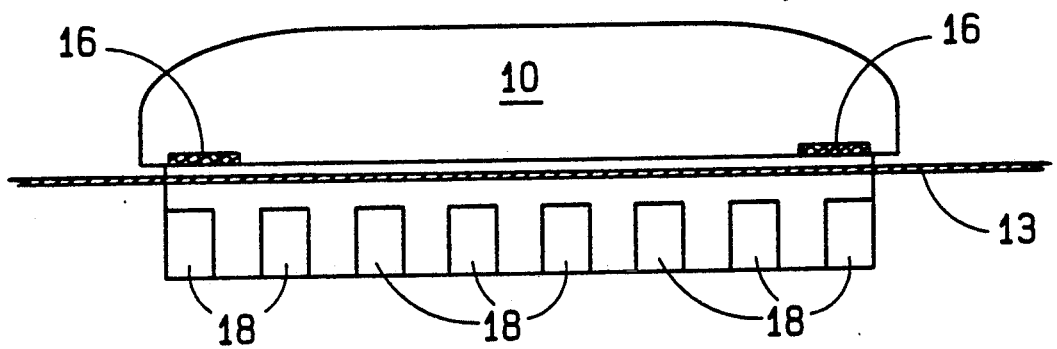
FIG. 4 shows a side view of the maglev vehicle and its electrodynamic levitation and propulsion system.

It is possible to increase the total magnetic flux linking the ground coils 20 to the strong field SCM's 18, FIG. 4, by either increasing the number of strong field SCM's 18 along the length of the vehicle 10 or by extending their dimensions in the vertical direction without increasing the current density applied to the strong field SCM's. The invention also allows for several configurations of the shielding material. Those skilled in the art will recognize that alternate configurations may be included in this invention.

Magnets 16 and 18 are comprised of current-carrying superconducting coils enclosed in dewars (not shown) and maintained at cryogenic temperatures using appropriate refrigeration equipment (not shown).

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A magnetic leviation and propulsion system for a vehicle having a base surface and two ends where the vehicle is adapted to travel over a roadbed comprising:

a slotted guideway having a vertical slot with two parallel interior surfaces and an opening opposite the roadbed where said guideway is coupled to the roadbed either directly for at grade structures or indirectly through a plurality of pillars which support said guideway;

a vertical undercarriage attached along a centerline of the base surface of the vehicle where said vertical undercarriage resides in said vertical slot of said guideway, a plurality of ground coils affixed to both said interior surfaces of said vertical slot of said slotted guideway where said ground coils are vertically oriented and continue the length of said slotted guideway and where said coils are energized by an external multiphase power source to create a traveling magnetic wave, a plurality of strong field superconducting magnets attached to the vertical undercarriage in a manner so that said magnets are approximately parallel to said ground coils on either side of said strong field superconducting magnets and have an approximate vertical orientation and where said strong field superconducting magnets interact with said traveling magnetic wave to propel the vehicle along said guideway and where a vertical distance between an upper surface of said strong field superconducting magnets and the vehicle base can be controlled;

a plurality of weak field superconducting magnets oriented approximately horizontally and attached to the base of the vehicle, a plurality of guideway-mounted non-magnetic conductors oriented approximately parallel to said weak field superconducting magnets and located beneath said weak field magnets where an interaction between said weak field magnets and said non-magnetic conductors generates a repulsive force between said conductors and said weak field magnets to provide for leviation and guidance of the vehicle when said weak field superconducting magnets are energized, a means for magnetically shielding a passenger cabin in the vehicle from a magnetic field generated by said strong field superconducting magnets.

2. The apparatus of claim 1 wherein at least one of said weak field superconducting magnets is positioned at one end of the vehicle and at least one other of said weak field superconducting magnets is positioned at the opposite end of the vehicle.

3. The apparatus of claim 1 wherein said means for magnetic shielding comprises a ferromagnetic material located above said vertical undercarriage and positioned in the base of the vehicle to shield the passenger cabin from a magnetic field generated by said strong field superconducting magnets.

4. The apparatus of claim 1 wherein said means for magnetic shielding comprises a ferromagnetic material located above said vertical undercarriage and attached to said guideway to shield the passenger cabin from the magnetic field induced by the strong field superconducting magnets.

5. The apparatus of claim 4 wherein said means for magnetic shielding includes adding magnetic shielding interior to the part of said vertical undercarriage next to the base of the vehicle.

6. The apparatus of claim 1 wherein said vertical distance between said upper surface of said strong field superconducting magnet and the vehicle base is selected so as to minimize a magnetic field experienced in said vehicle.

* * * * *